(12) United States Patent
Lindahl et al.

(10) Patent No.: US 10,836,474 B2
(45) Date of Patent: Nov. 17, 2020

(54) AIRCRAFT LANDING GEAR STEERING SYSTEMS AND METHODS WITH ENHANCED SHIMMY PROTECTION

(71) Applicant: The Boeing Company, Chicago, IL (US)

(72) Inventors: Gary M. Lindahl, Newcastle, WA (US); Mitchell L. R. Mellor, Bothell, WA (US); Brian P. Salsbery, Everett, WA (US)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 16/026,396

(22) Filed: Jul. 3, 2018

(65) Prior Publication Data
US 2020/0010181 A1    Jan. 9, 2020

(51) Int. Cl.
| | | |
|---|---|---|
| *B64C 25/50* | (2006.01) | |
| *F15B 11/16* | (2006.01) | |
| *F15B 13/02* | (2006.01) | |
| *F15B 13/06* | (2006.01) | |
| *F15B 15/14* | (2006.01) | |

(52) U.S. Cl.
CPC .............. *B64C 25/50* (2013.01); *F15B 11/16* (2013.01); *F15B 13/027* (2013.01); *F15B 13/06* (2013.01); *F15B 15/1409* (2013.01); *F15B 2211/30505* (2013.01); *F15B 2211/329* (2013.01); *F15B 2211/40507* (2013.01); *F15B 2211/423* (2013.01); *F15B 2211/6346* (2013.01); *F15B 2211/665* (2013.01); *F15B 2211/7053* (2013.01); *F15B 2211/7056* (2013.01); *F15B 2211/71* (2013.01)

(58) Field of Classification Search
CPC .. B64C 25/50; B64C 25/505; B64C 2025/345
See application file for complete search history.

(56) References Cited

U.S. PATENT DOCUMENTS

| | | | |
|---|---|---|---|
| 2,732,151 A | | 1/1956 | Stoner |
| 3,025,674 A | * | 3/1962 | Cameron-Johnson ....................... B64C 25/50 60/572 |
| 5,595,359 A | * | 1/1997 | Meneghetti ............. B64C 25/50 244/103 R |

(Continued)

FOREIGN PATENT DOCUMENTS

| | | |
|---|---|---|
| EP | 2 067 911 | 6/2009 |
| GB | 2 477 127 | 7/2011 |

OTHER PUBLICATIONS

Extended European Search Report prepared by the European Patent Office in application No. 19 18 3780.6 dated Oct. 30, 2019.

*Primary Examiner* — Brian M O'Hara
(74) *Attorney, Agent, or Firm* — McDonnell Boehnen Hulbert & Berghoff LLP

(57) ABSTRACT

An example aircraft includes (i) a landing gear having a chassis, an axle, and wheels mounted to ends of the axle; (ii) a hydraulic actuator including a cylinder, a first piston coupled to the chassis, and a second piston coupled to the axle; and (iii) a directional control valve including: inlet ports configured to be fluidly coupled to a source of pressurized fluid, tank ports configured to be fluidly coupled to a tank, and workports configured to be fluidly coupled to the hydraulic actuator.

20 Claims, 9 Drawing Sheets

(56) References Cited

U.S. PATENT DOCUMENTS

| | | | |
|---|---|---|---|
| 8,899,517 B2 * | 12/2014 | Bennett | B64C 25/50 244/50 |
| 8,925,584 B2 | 1/2015 | Balmonet et al. | |
| 9,051,048 B2 * | 6/2015 | Martin | B64C 25/34 |
| 2005/0082427 A1 | 4/2005 | Seung | |

* cited by examiner

1100 ─▶

1102

RECEIVING, AT A CONTROLLER, A REQUEST TO STEER AN AIRCRAFT IN A PARTICULAR DIRECTION, WHERE THE AIRCRAFT COMPRISES: (I) A LANDING GEAR HAVING A CHASSIS, AT LEAST ONE AXLE ROTATABLY COUPLED TO THE CHASSIS AT A JOINT, AND RESPECTIVE WHEELS MOUNTED TO RESPECTIVE ENDS OF THE AT LEAST ONE AXLE, SUCH THAT ROTATION OF THE AT LEAST ONE AXLE ABOUT THE JOINT CAUSES THE AIRCRAFT TO BE STEERED, (II) A HYDRAULIC ACTUATOR COMPRISING A CYLINDER, A FIRST PISTON SLIDABLY ACCOMMODATED IN THE CYLINDER COUPLED TO THE CHASSIS, AND A SECOND PISTON SLIDABLY ACCOMMODATED IN THE CYLINDER AND COUPLED TO THE AT LEAST ONE AXLE, AND (III) A DIRECTIONAL CONTROL VALVE CONFIGURED TO CONTROL FLUID FLOW FROM A SOURCE OF PRESSURIZED FLUID TO THE HYDRAULIC ACTUATOR AND FLUID FLOW FROM THE HYDRAULIC ACTUATOR TO A TANK SO AS TO CONTROL MOTION OF THE FIRST PISTON AND THE SECOND PISTON WITHIN THE CYLINDER

1104

IN RESPONSE TO RECEIVING THE REQUEST, SENDING, BY THE CONTROLLER, A SIGNAL TO ACTUATE EITHER A FIRST PILOT VALVE OR A SECOND PILOT VALVE TO PROVIDE PRESSURIZED FLUID TO A FIRST PILOT PORT OF THE DIRECTIONAL CONTROL VALVE OR TO A SECOND PILOT PORT OF THE DIRECTIONAL CONTROL VALVE SO AS TO ACTUATE THE DIRECTIONAL CONTROL VALVE AND PROVIDE PRESSURIZED FLUID TO THE HYDRAULIC ACTUATOR, THEREBY MOVING AT LEAST ONE OF FIRST PISTON AND THE SECOND PISTON TO ROTATE THE AT LEAST ONE AXLE ABOUT THE JOINT AND STEER THE AIRCRAFT IN THE PARTICULAR DIRECTION

FIG. 11

SENDING A SECOND SIGNAL TO A PILOT ENABLING VALVE TO ENABLE PROVIDING PRESSURIZED FLUID FROM THE SOURCE OF PRESSURIZED FLUID TO THE FIRST PILOT VALVE AND THE SECOND PILOT VALVE AND ENABLE ACTUATION OF THE DIRECTIONAL CONTROL VALVE

FIG. 12

RECEIVING, FROM A POSITION SENSOR OF A SHUTOFF VALVE, SENSOR INFORMATION INDICATING THAT THE SHUTOFF VALVE IS UNACTUATED, WHEREIN SENDING THE SIGNAL TO ACTUATE EITHER THE FIRST PILOT VALVE OR THE SECOND PILOT VALVE IS RESPONSIVE TO RECEIVING THE SENSOR INFORMATION INDICATING THAT THE SHUTOFF VALVE IS UNACTUATED

FIG. 13

AIRCRAFT LANDING GEAR STEERING SYSTEMS AND METHODS WITH ENHANCED SHIMMY PROTECTION

FIELD

The present disclosure relates generally to a steering system for an aircraft. In further examples, methods and systems for an aircraft landing gear steering system with enhanced shimmy protection are provided.

BACKGROUND

Aircraft landing gear is typically attached to primary structural members of the aircraft and supports the weight of an aircraft during landing and ground operations. The type of landing gear depends on the aircraft design and its intended use. Many landing gears have wheels to facilitate operation to and from hard surfaces, such as airport runways. Regardless of the type of landing gear utilized, shock absorbing equipment, brakes, retraction mechanisms, steering mechanisms and actuators, controls, warning devices, cowling, fairings, and structural members configured to attach the landing gear to the aircraft are considered parts of the landing gear system.

Three basic arrangements of landing gear are used: tail wheel type landing gear (also known as conventional gear), tandem landing gear, and tricycle-type landing gear. Typically, the tricycle-type landing gear, which includes main landing gear and nose landing gear, is used.

The nose landing gear of a few aircraft with tricycle-type landing gear is not controllable. It rather casters as steering is accomplished with differential braking during taxi. However, some aircraft have steerable nose landing gear. Further, on some heavy aircraft, it may be desirable to also have steerable main landing gear. Existing steering systems can be expensive and might include complex mechanical configurations. Further, although a landing gear may operate as expected during ground take-off and landing maneuvers over several hundred or so flights, it may then suddenly exhibit shimmy oscillations under particular conditions. Shimmy oscillations of aircraft landing gear remain an ongoing challenge in landing gear design.

Whether steering an aircraft is accomplished using the nose landing gear, the main landing gear, or both, it may be desirable to have a steering system that is simpler and less expensive than existing steering systems, and capable of precluding oscillations in the landing gear. It is with respect to these and other considerations that the disclosure made herein is presented.

SUMMARY

The present disclosure describes examples that relate to an aircraft landing gear steering system with enhanced shimmy protection.

In one aspect, the present disclosure describes a hydraulic system. The hydraulic system includes a hydraulic actuator including: (i) a cylinder, (ii) a partition disposed in the cylinder and configured to divide the cylinder into a first partition and a second partition, (iii) a first piston slidably accommodated in the first partition and having a piston head and a rod extending from the piston head along a longitudinal axis of the cylinder, where the rod is configured to be coupled to a chassis of a landing gear of an aircraft, and where the piston head divides the first partition into a first chamber and a second chamber, and (iv) a second piston slidably accommodated in the second partition and having a respective piston head and a respective rod extending from the respective piston head along the longitudinal axis of the cylinder, where the respective rod is configured to be coupled to an axle of the landing gear of the aircraft, and where the respective piston head divides the second partition into a third chamber and a fourth chamber. The hydraulic system also includes a directional control valve including: (i) a first inlet port configured to be fluidly coupled to a source of pressurized fluid, (ii) a second inlet port configured to be fluidly coupled to the source of pressurized fluid, (iii) a first tank port configured to be fluidly coupled to a tank, (iv) a second tank port configured to be fluidly coupled to the tank, (v) a first workport configured to be fluidly coupled to the first chamber, (vi) a second workport configured to be fluidly coupled to the second chamber, (vii) a third workport configured to be fluidly coupled to the third chamber, and (viii) a fourth workport configured to be fluidly coupled to the fourth chamber.

In another aspect, the present disclosure describes an aircraft. The aircraft includes a landing gear having (i) a chassis, (ii) at least one axle rotatably coupled to the chassis at a joint, and (iii) respective wheels mounted to respective ends of the at least one axle, such that rotation of the at least one axle about the joint causes the aircraft to be steered. The aircraft also includes a hydraulic actuator including: (i) a cylinder, (ii) a partition disposed in the cylinder and configured to divide the cylinder into a first partition and a second partition, (iii) a first piston slidably accommodated in the first partition and having a piston head and a rod extending from the piston head along a longitudinal axis of the cylinder, where the rod is configured to be coupled to the chassis, and where the piston head divides the first partition into a first chamber and a second chamber, and (iv) a second piston slidably accommodated in the second partition and having a respective piston head and a respective rod extending from the respective piston head along the longitudinal axis of the cylinder, where the respective rod is configured to be coupled to the at least one axle, and where the respective piston head divides the second partition into a third chamber and a fourth chamber. The aircraft further includes a directional control valve including: (i) a first inlet port configured to be fluidly coupled to a source of pressurized fluid, (ii) a second inlet port configured to be fluidly coupled to the source of pressurized fluid, (iii) a first tank port configured to be fluidly coupled to a tank, (iv) a second tank port configured to be fluidly coupled to the tank, (v) a first workport configured to be fluidly coupled to the first chamber, (vi) a second workport configured to be fluidly coupled to the second chamber, (vii) a third workport configured to be fluidly coupled to the third chamber, and (viii) a fourth workport configured to be fluidly coupled to the fourth chamber.

In another aspect, the present disclosure describes a method of steering an aircraft. The method includes receiving, at a controller, a request to steer the aircraft in a particular direction. The aircraft includes: (i) a landing gear having a chassis, at least one axle rotatably coupled to the chassis at a joint, and respective wheels mounted to respective ends of the at least one axle, such that rotation of the at least one axle about the joint causes the aircraft to be steered, (ii) a hydraulic actuator including a cylinder, a first piston slidably accommodated in the cylinder and coupled to the chassis, and a second piston slidably accommodated in the cylinder and coupled to the at least one axle, and (iii) a directional control valve configured to control fluid flow from a source of pressurized fluid to the hydraulic actuator and fluid flow from the hydraulic actuator to a tank so as to control motion of the first piston and the second piston within the cylinder. The method also includes, in response to receiving the request, sending, by the controller, a signal to actuate either a first pilot valve or a second pilot valve to provide pressurized fluid to a first pilot port of the directional control valve or to a second pilot port of the directional control valve so as to actuate the directional control valve and provide pressurized fluid to the hydraulic actuator, thereby moving at least one of the first piston and the second piston to rotate the at least one axle about the joint and steer the aircraft in the particular direction.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 11 is a flowchart of a method for steering an aircraft, in accordance with an example implementation.

FIG. 12 is a flowchart of additional operations that can be executed and performed with the method of FIG. 11, in accordance with an example implementation.

FIG. 13 is a flowchart of additional operations that can be executed and performed with the method of FIG. 11, in accordance with an example implementation.

DETAILED DESCRIPTION

The description provided below uses an aircraft that has a tricycle-type landing gear arrangement and a steering system for the main landing gear for illustration purposes only. However, the description is applicable to other landing gear arrangements and the steering system can be applied to any other landing gear of any type of aircraft (launch vehicles, spacecraft landers, etc.).

The main landing gear on a tricycle-type landing gear arrangement can be attached to a reinforced wing structure or fuselage structure. The number and location of wheels on the main landing gear can vary based on the type of aircraft and the load that the main landing gear is expected to carry. The main landing gear can have two or more wheels. Multiple wheels spread the weight of the aircraft over a larger area. They also provide a safety margin in case one tire malfunctions.

Heavy aircraft may use four or more wheel assemblies on each main landing gear. In examples, such aircraft can have undercarriages, e.g., wheeled structures, disposed beneath an aircraft and coupled to a wing or fuselage structure. The undercarriage can include wheels attached to a chassis or frame carrying one or more wheelsets. The chassis can also be referred to as a bogie and can be configured as a modular subassembly of wheels and axles. The number of wheels included in the bogie can be based on the gross design weight of the aircraft and the surface type on which the loaded aircraft is expected to land.

Figure 1:
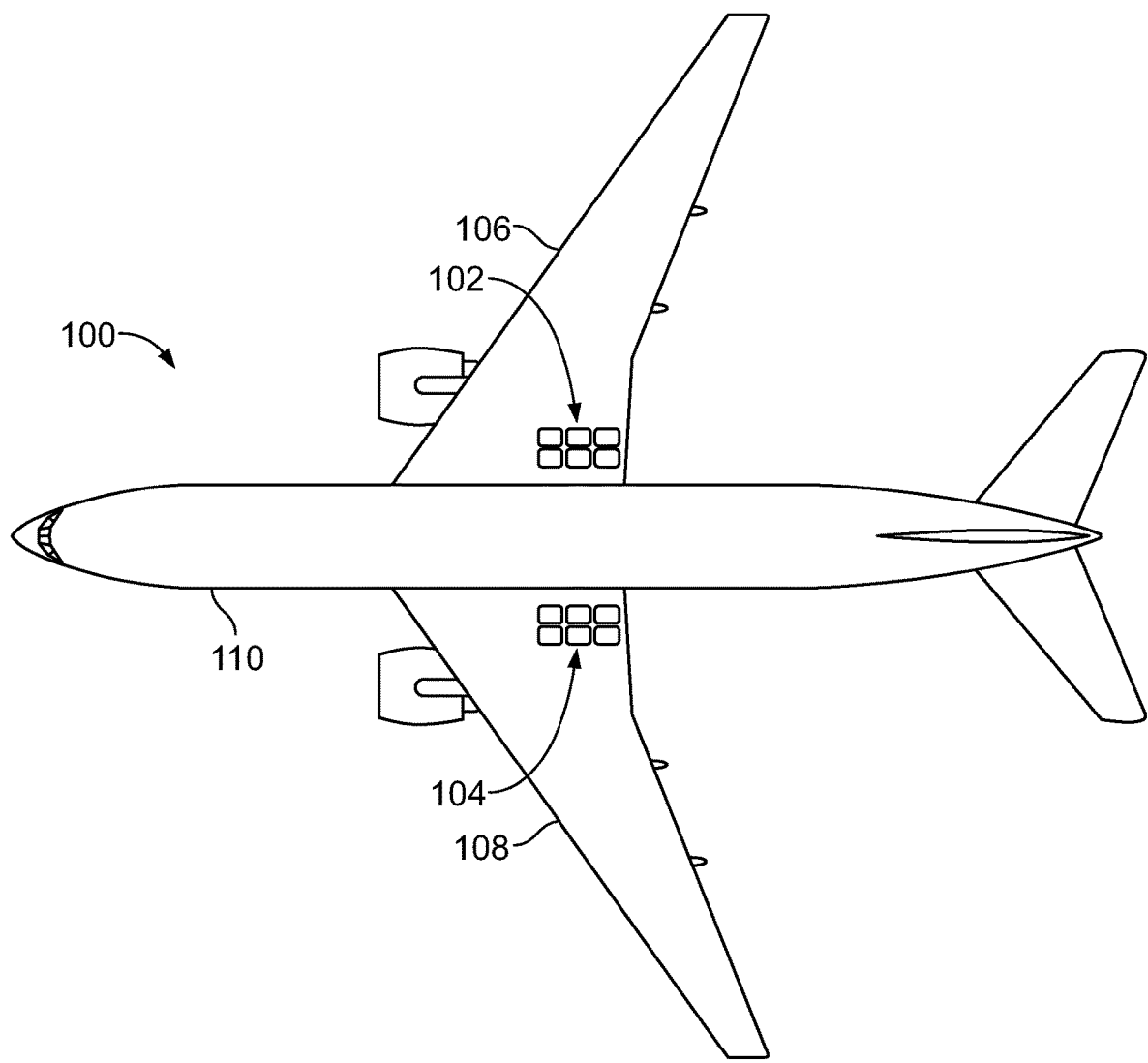
FIG. 1 illustrates an aircraft having a first landing gear and a second landing gear, in accordance with an example implementation.

FIG. 1 illustrates an aircraft 100 having a first landing gear 102 and a second landing gear 104, in accordance with an example implementation. The aircraft 100 can also have a nose landing gear that is not shown.

The first landing gear 102 is mounted to a right wing 106 of the aircraft 100 and the second landing gear 104 is mounted to a left wing 108 of the aircraft 100. Each landing gear 102, 104 is shown as having 6 wheels. The configuration depicted in FIG. 1 is an example for illustration only. An aircraft can have more landing gear structures disposed in different arrangements, e.g., additional landing gear structures can be mounted to a fuselage 110 of the aircraft 100. Also, a landing gear can have more or fewer wheels than as shown in FIG. 1.

Figure 2:
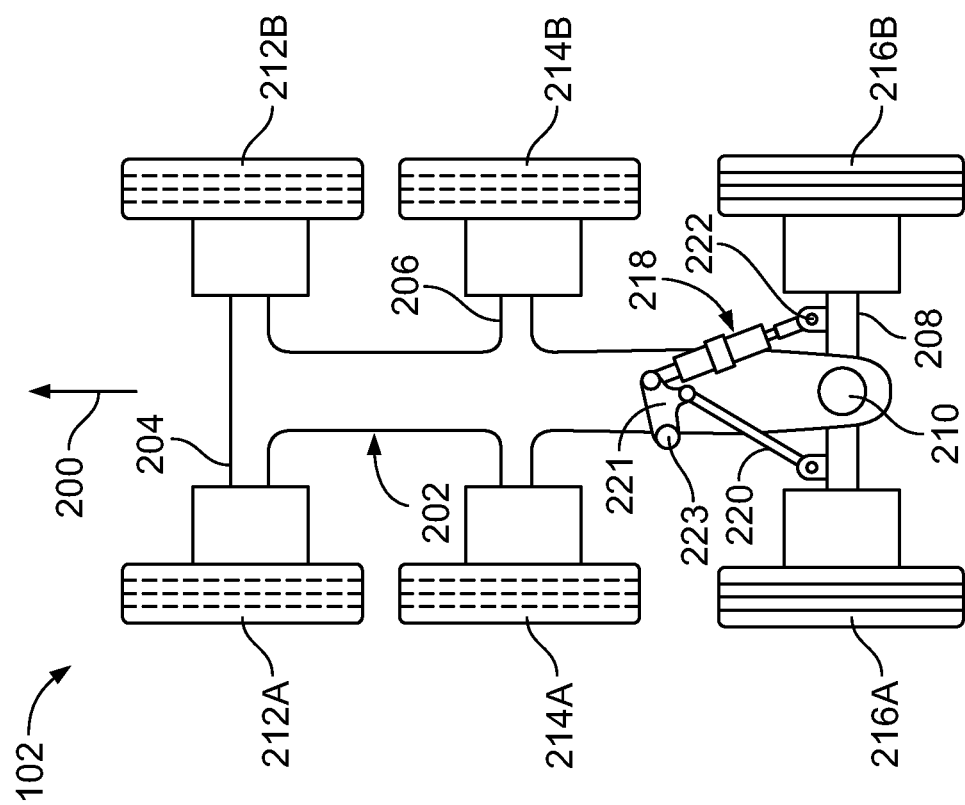
FIG. 2 illustrates a top view of a landing gear, in accordance with an example implementation.

FIG. 2 illustrates a top view of the landing gear 102, in accordance with an example implementation. Forward-facing direction of the aircraft 100 and the landing gear 102 is shown by an arrow 200 and labeled as "FWD" in FIG. 2.

The landing gear 102 includes a chassis 202 configured to have three axles: a front axle 204, a middle axle 206, and an aft or rear axle 208. The front axle 204 and the middle axle 206 are rigidly coupled to the chassis 202, whereas the rear axle 208 is rotatably coupled to the chassis 202 via a swivel or joint 210. Particularly, the rear axle 208 is configured to pivot about the joint 210 to steer the aircraft 100 as described below.

Two respective wheels are mounted at respective ends of each of the axles 204, 206, 208. For instance, wheels 212A, 212B are mounted to the front axle 204; wheels 214A, 214B are mounted to the middle axle 206; and wheels 216A, 216B are mounted to the rear axle 208. The wheels 212A-216B mounted to the axles 204, 206, 208 facilitate operation of the aircraft 100 on hard surfaces such as airport runways.

The landing gear 102 includes a hydraulic actuator 218 that couples the rear axle 208 to the chassis 202 as depicted in FIG. 2. The hydraulic actuator 218 is configured to have two pistons slidably accommodated within a cylinder as described in detail below. One of the pistons is coupled to the rear axle 208 at a pivot 222 that is eccentric relative to, or offset from, the joint 210 along the rear axle 208. In the position shown in FIG. 2, the pistons of the hydraulic actuator 218 lock or center the rear axle 208 in the un-rotated position shown in FIG. 2, enabling the aircraft 100 to move in a straight line without turning. Motion of the pistons (e.g., retraction and extension of the pistons within the cylinder) can cause the rear axle 208 to rotate about the joint 210, thereby steering the aircraft 100.

Particularly, the landing gear 102 includes a link 221 configured to be coupled to the chassis 202 at a pivot 223. Another link 220 (e.g., a fixed link) also couples the rear axle 208 to the link 221. As pistons of the hydraulic actuator 218 move, the link 221 pivots around the pivot 223, thus applying a force on the link 220, which in turn applies a force on the rear axle 208. With this configuration, the hydraulic actuator 218, the link 221, and the link 220 cooperate to apply a moment on the rear axle 208 to cause the rear axle 208 to pivot about the joint 210, thereby steering the aircraft 100.

Figure 3:
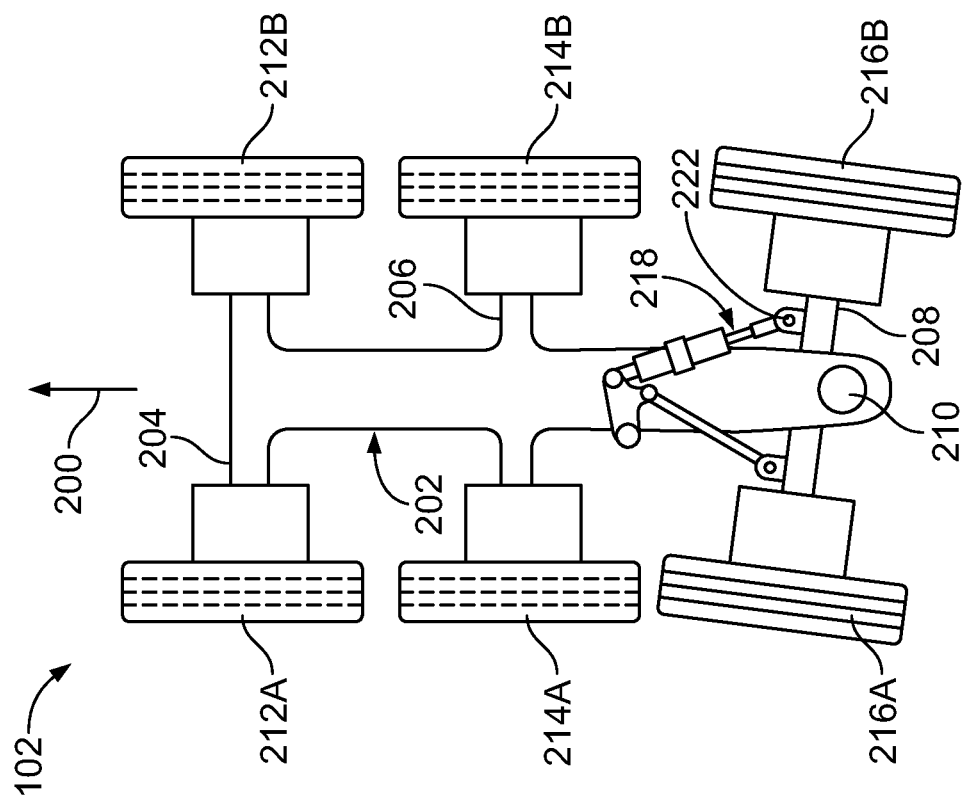
FIG. 3 illustrates a left turn configuration of a landing gear, in accordance with an example implementation.

FIG. 3 illustrates a left turn configuration of the landing gear 102, in accordance with an example implementation. As shown in FIG. 3, when the piston of the hydraulic actuator 218 coupled to the rear axle 208 is extended, the rear axle 208 rotates in a first rotational direction (e.g., clockwise) about the joint 210, causing the wheels 216A, 216B to rotate rightward. As a result, the aircraft 100 is steered in a corresponding direction, e.g., the aircraft 100 makes a left-hand turn as it moves forward.

Figure 4:
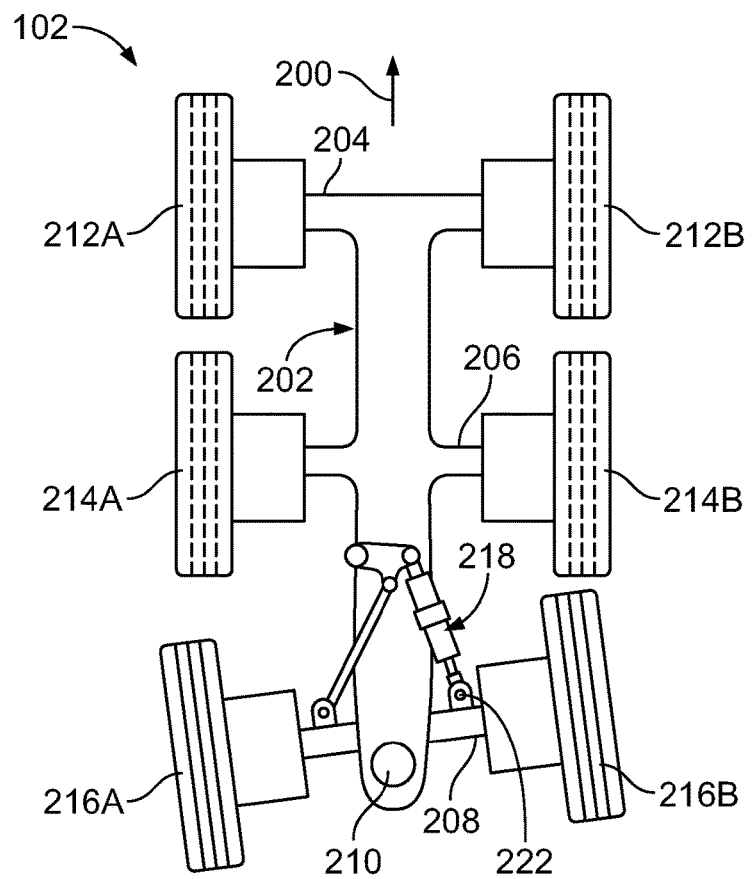
FIG. 4 illustrates a right turn configuration of the landing gear, in accordance with an example implementation.

FIG. 4 illustrates a right turn configuration of the landing gear 102, in accordance with an example implementation. As shown in FIG. 4, when the piston of the hydraulic actuator 218 coupled to the chassis 202 and piston coupled to the rear axle 208 are retracted, the rear axle 208 rotates in a second rotational direction (e.g., counter-clockwise) about the joint 210, causing the wheels 216A, 216B to rotate leftward. As a result, the aircraft 100 is steered in a respective corresponding direction, e.g., the aircraft 100 makes a right-hand turn as it moves forward.

The landing gear 104 can be configured similar to the landing gear 102 and can be configured to operate similarly.

Figure 5:
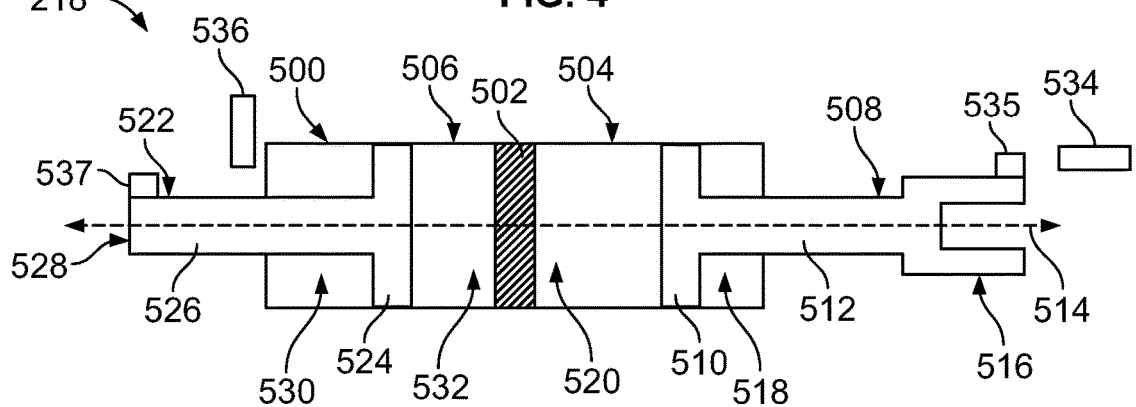
FIG. 5 illustrates the hydraulic actuator, in accordance with an example implementation.

FIG. 5 illustrates the hydraulic actuator 218, in accordance with an example implementation. The hydraulic actuator 218 includes a cylinder 500, the inside of which is divided via a partition 502 into a first partition 504 and a second partition 506. The cylinder 500 can also be referred to as a barrel, body, or housing of the hydraulic actuator 218.

The hydraulic actuator 218 includes a first piston 508 slidably accommodated in the first partition 504 of the cylinder 500. The first piston 508 includes a piston head 510 and a rod 512 extending from the piston head 510 along a central longitudinal axis 514 of the cylinder 500. The rod 512 has a clevis 516 disposed at a tip of the rod 512 and configured to be coupled to the chassis 202 of the landing gear 102 as shown in FIGS. 2-4. The piston head 510 divides the first partition 504 of the cylinder 500 into a first chamber 518 and a second chamber 520.

The hydraulic actuator 218 also includes a second piston 522 slidably accommodated in the second partition 506 of the cylinder 500. The cylinder 500 is floating between the first piston 508 and the second piston 522, and is thus free to move longitudinally along the central longitudinal axis 514.

The second piston 522 includes a respective piston head 524 and a respective rod 526 extending from the piston head 524 along the central longitudinal axis 514 of the cylinder 500. The rod 526 can have a clevis (not shown) or similar type of connector disposed at a tip 528 of the rod 526 and configured to be coupled to the rear axle 208 of the landing gear 102 at the pivot 222 shown in FIGS. 2-4. The piston head 524 divides the second partition 506 of the cylinder 500 into a third chamber 530 and a fourth chamber 532.

The partition 502 is configured as a stopper for the pistons 508 and 522. Further, the partition 502 is configured to seal the first partition 504 from the second partition 506 and vice versa. Particularly, the partition 502 restricts communication of pressurized fluid between the second chamber 520 and the fourth chamber 532.

The hydraulic actuator 218 can further include a first position sensor 534 and a first indicator 535. In an example, the first position sensor 534 is fixed, whereas the first indicator 535 can be coupled to the first piston 508 and movable therewith. The first position sensor 534 and the first indicator 535 cooperate to provide sensor information to a controller to indicate position of the first piston 508 to the controller. Particularly, the first indicator 535 operates as a target (e.g., a magnet) that when positioned within a threshold distance from the first position sensor 534, the first position sensor 534 detects presence of the first indicator 535, thus detecting that the first piston 508 is fully extended. In other words, as the first piston 508 extends and the first indicator 535 approaches the first position sensor 534 and becomes within the threshold distance therefrom, the first position sensor 534 detects that the first piston 508 is fully extended.

Similarly, the hydraulic actuator 218 can include a second position sensor 536 and a second indicator 537. In an example, the second position sensor 536 is fixed, whereas the second indicator 537 can be coupled to the second piston 522 and movable therewith. The second position sensor 536 and the second indicator 537 cooperate to provide sensor information to the controller to indicate position of the second piston 522 to the controller. Particularly, the second indicator 537 operates as a target (e.g., a magnet) that when positioned within a threshold distance from the second position sensor 536, the second position sensor 536 detects presence of the second indicator 537, thus detecting that the second piston 522 is fully retracted. In other words, as the second piston 522 retracts and the second indicator 537 approaches the second position sensor 536 and becomes within the threshold distance therefrom, the second position sensor 536 detects that the second piston 522 is fully retracted.

In one example, the position sensors 534, 536 can be configured to measure position of the respective pistons 508, 522 and provide a signal proportional to a position of the respective pistons 508, 522 within the cylinder 500 to the controller. In another example, the position sensors 534, 536 can be configured as position switches. In this example, when the first piston 508 is extended (e.g., to the right in FIG. 5) all the way to an end of its stroke, the first position sensor 534 detects the first indicator 535 and provides information indicative of such detection to the controller. The controller then determines that the first piston 508 reached the end of its stroke. Similarly, when the second piston 522 is retracted (e.g., to the right in FIG. 5) all the way, the second position sensor 536 detects the second indicator 537 and provides information indicative of such detection to the controller. The controller then determines that the second piston 522 is fully retracted.

Figure 6:
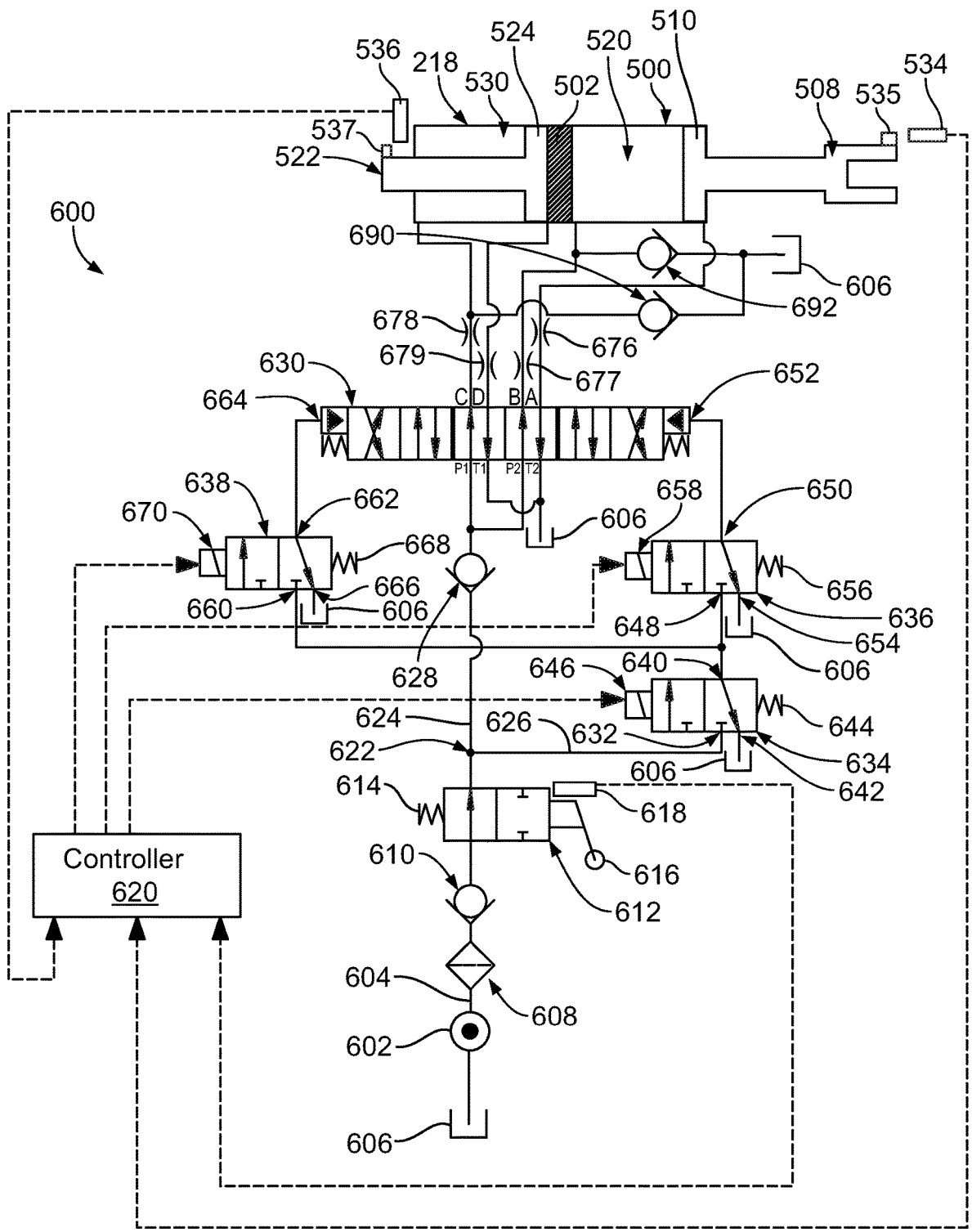
FIG. 6 illustrates a hydraulic system for controlling a hydraulic actuator, in accordance with an example implementation.

FIG. 6 illustrates a hydraulic system 600 for controlling the hydraulic actuator 218, in accordance with an example implementation. The hydraulic system 600 can be included in, or fluidly coupled to, a hydraulic system of the aircraft 100 configured to control other actuators and control surfaces of the aircraft 100, for example.

The hydraulic system 600 includes a source 602 of pressurized fluid configured to provide a supply of pressurized fluid to a supply line 604. The source 602 of pressurized fluid can, for example, be a pump configured to receive fluid from a tank 606, pressurize the fluid, and then provide the pressurized fluid to the supply line 604. Such pump can be a fixed displacement pump, a variable displacement pump, or a load-sensing variable displacement pump, as examples. A relief valve (e.g., electrohydraulic pressure relief valve that is not shown) can be coupled to the source 602 of pressurized fluid to set a particular pressure level for fluid provided by the source 602 of pressurized fluid to the rest of the hydraulic system 600. Additionally or alternatively, the source 602 of pressurized fluid can be an accumulator. Further, the source 602 of pressurized fluid can also be configured to provide pressurized fluid to other actuators and components of a hydraulic system of the aircraft 100. The source 602 of pressurized fluid can also be another component in the hydraulic system of the aircraft 100, and fluid exiting such component is provided to the hydraulic system 600. The source 602 is configured to provide fluid pressurized to high pressure levels, e.g., 5000-6000 pounds per square inch (psi).

The hydraulic system 600 includes a filter 608 configured to restricts fluid contaminants that are larger than a particular size from flowing to components downstream of the filter 608. This way, the filter 608 can preclude contaminants from depositing in small orifices or openings, which can affect performance of the hydraulic system 600 (e.g., contaminants that can be deposited at a seat of a check valve, thereby precluding a movable element of the check valve from sealing fluid when seated).

The hydraulic system 600 includes a check valve 610 disposed downstream of the filter 608. The check valve 610 is configured to allow fluid exiting the filter 608 to flow downstream to other components of the hydraulic system 600, while blocking reverse fluid flow, e.g., blocking fluid from flow back to the source 602. The term "blocking" is used in this disclosure to indicate limiting substantial fluid flow, but it should be understood that some leakage fluid might be allowed.

The hydraulic system 600 also includes a shutoff valve 612 disposed downstream of the check valve 610. The shutoff valve 612 can be configured as a 2-way 2-position mechanically- or manually-actuated valve. The shutoff valve 612 can, for example, have a poppet or spool movable within a bore of a valve body and the spool can be spring-biased via a spring 614 to an open position. As such, the shutoff valve 612 is normally-open. The open position allows fluid to flow from the check valve 610 through the shutoff valve 612 to components downstream of the shutoff valve 612.

A lever 616 (or similar manual actuation element such as a knob) can be coupled to the spool such that the lever 616, when actuated (e.g., pushed or pulled) by an operator, moves the spool to a closed position that blocks or shuts off fluid from flowing through the shutoff valve 612. With this configuration, the shutoff valve 612 can be used to manually disable the hydraulic system 600. For instance, if a maintenance crew is performing maintenance procedures on the hydraulic system 600, an operator can manually actuate the lever 616 to shut off fluid flow from the source 602, thereby disabling the hydraulic system 600.

A position switch or position sensor 618 can be coupled to the spool of the shutoff valve 612 or to the lever 616. The position sensor 618 can provide sensor information to a controller 620 of the hydraulic system 600 to indicate whether the lever 616 is actuated or not. If the sensor information indicates to the controller 620 that the lever 616 is actuated, the controller 620 can then provide an indication (e.g., a message on a cockpit display) to a pilot crew of the aircraft 100 informing the pilot crew that maintenance is being performed and that steering operation is not available and the hydraulic system 600 is disabled. When the lever 616 is returned to an unactuated position, and the shutoff valve 612 is returned to its open position, the controller 620 can determine that the hydraulic system 600 is enabled, and provide a message to the pilot crew informing the pilot crew that maintenance is completed and that steering operation is available.

The controller 620 can include one or more processors or microprocessors and may include data storage (e.g., memory, transitory computer-readable medium, non-transitory computer-readable medium, etc.). The data storage may have stored thereon instructions that, when executed by the one or more processors of the controller 620, cause the controller 620 to perform the operations described herein. Signal lines to and from the controller 620 are depicted as dashed lines in FIG. 6. The controller 620 can receive sensor information via signals from various sensors in the hydraulic system 600 and provide electric signals to various solenoids to actuate electrically-actuated valves in the hydraulic system 600 as described below.

When the shutoff valve 612 is in its open position (e.g., the lever 616 is not actuated), fluid flowing through the shutoff valve 612 reaches a junction point 622 at which fluid can branch off to flow through hydraulic line 624 and hydraulic line 626. Fluid flowing through the hydraulic line 624 flows through a check valve 628 that is configured to allow fluid flowing through the hydraulic line 624 to flow downstream to a directional control valve 630, while blocking reverse fluid flow, e.g., blocking fluid from flowing back from the directional control valve 630 to the hydraulic line 624. The directional control valve 630 is configured to control fluid flow to and from the hydraulic actuator 218 as described below with respect to FIG. 7.

Fluid flowing through the hydraulic line 626 is provided to an inlet port 632 of a pilot enabling valve 634. The pilot enabling valve 634 also has an outlet port 640 fluidly coupled to a first pilot valve 636 and a second pilot valve 638, and has an exhaust or tank port 642 configured to be fluidly coupled to the tank 606. With this configuration, that pilot enabling valve 634 is configured to control fluid flow to the first pilot valve 636 and the second pilot valve 638.

As depicted in FIG. 6, the pilot enabling valve 634 can be configured as a spring-biased 3-way, 2-position valve. For example, the pilot enabling valve 634 can have a spring 644 that biases a movable element (e.g., a spool or poppet) of the pilot enabling valve 634 to a first position in which the outlet port 640 is fluidly coupled to the tank port 642. In the first position, pressurized fluid is not provided from the inlet port 632 to the outlet port 640.

The pilot enabling valve 634 can be electrically-operated via a solenoid 646. When the controller 620 sends an actuation signal to the solenoid 646, the solenoid 646 can apply a force on the movable element of the pilot enabling valve 634 against the spring 644, thereby moving the movable element to a second position. In the second position, the outlet port 640 is fluidly coupled to the inlet port 632, and thus pressurized fluid is provided from the inlet port 632 to the outlet port 640 and then to the first pilot valve 636 and the second pilot valve 638.

The first pilot valve 636 and the second pilot valve 638 can be configured, similar to the pilot enabling valve 634, as 3-way, 2-position valves. The first pilot valve 636 can have: (i) an inlet port 648 fluidly coupled to the outlet port 640 of the pilot enabling valve 634, (ii) an outlet port 650 fluidly coupled to a first pilot port 652 of the directional control valve 630, and (iii) a tank port 654 fluidly coupled to the tank 606. The first pilot valve 636 can also have a spring 656 that biases a movable element (e.g., a spool or poppet) of the first pilot valve 636 to a first position in which the outlet port 650 is fluidly coupled to the tank port 654 and pressurized fluid is not provided from the inlet port 648 to the outlet port 650.

The first pilot valve 636 can be electrically-operated via a solenoid 658. When the controller 620 sends an actuation signal to the solenoid 658, the solenoid 658 can apply a force on the movable element of the first pilot valve 636 against the spring 656, thereby moving the movable element to a second position. In the second position, the outlet port 650 is fluidly coupled to the inlet port 648, and thus pressurized fluid is provided from the inlet port 648 to the outlet port 650 and then to the first pilot port 652 of the directional control valve 630.

Similarly, the second pilot valve 638 can have: (i) an inlet port 660 fluidly coupled to the outlet port 640 of the pilot enabling valve 634, (ii) an outlet port 662 fluidly coupled to a second pilot port 664 of the directional control valve 630, and (iii) a tank port 666 fluidly coupled to the tank 606. The second pilot valve 638 can also have a spring 668 that biases a movable element (e.g., a spool or poppet) of the second pilot valve 638 to a first position in which the outlet port 662 is fluidly coupled to the tank port 666 and pressurized fluid is not provided from the inlet port 660 to the outlet port 662.

The second pilot valve 638 can be electrically-operated via a solenoid 670. When the controller 620 sends an actuation signal to the solenoid 670, the solenoid 670 can apply a force on the movable element of the second pilot valve 638 against the spring 668, thereby moving the movable element to a second position. In the second position, the outlet port 662 is fluidly coupled to the inlet port 660, and thus pressurized fluid is provided from the inlet port 660 to the outlet port 662 and then to the second pilot port 664 of the directional control valve 630.

With this configuration, the pilot enabling valve 634 operates as an "arming" valve that, when actuated via the solenoid 646, provides pressurized fluid to the pilot valves 636, 638 to enable operation of the directional control valve 630, and thus enable steering the landing gear 102 via the hydraulic actuator 218. When the pilot enabling valve 634 is not actuated, pressurized fluid is not provided to the pilot valves 636, 638, and thus the directional control valve 630 and steering the landing gear 102 via the hydraulic actuator 218 are disabled.

When the pilot enabling valve 634 is actuated and one of the pilot valves 636, 638 is actuated, pressurized fluid is provided to the first pilot port 652 or the second pilot port 664 to enable actuation of the directional control valve 630 to a particular state. As depicted schematically in FIG. 6, the directional control valve 630 can operate in one of a first state, a second state, and a third state based on a position of a spool or movable element within the directional control valve.

Figure 7:
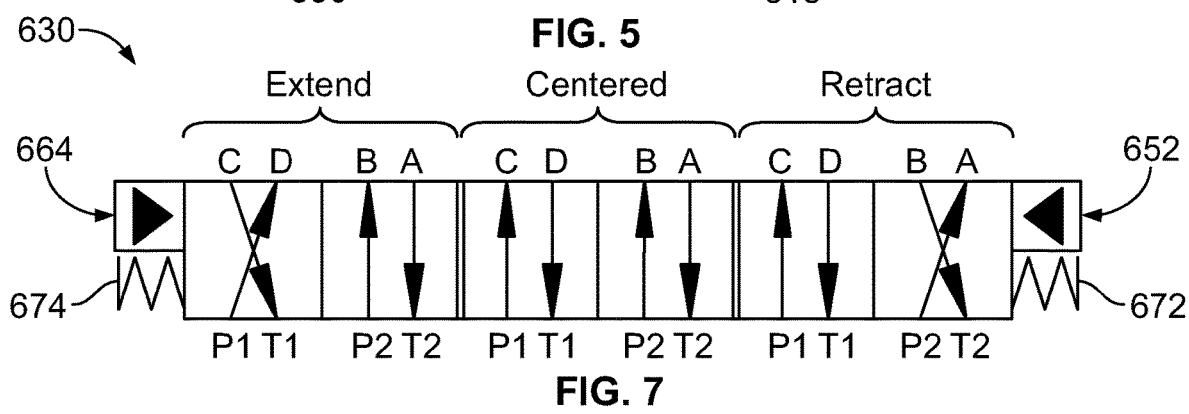
FIG. 7 illustrates a schematic representation of a directional control valve, in accordance with an example implementation.

FIG. 7 illustrates a schematic representation of the directional control valve 630, in accordance with an example implementation. The directional control valve 630 can be configured to have a valve body (e.g., a sleeve or housing) and a spool that is longitudinally movable in a bore within the valve body. The directional control valve 630 can have a first inlet port "P1" and a second inlet port "P2", with both inlet ports P1 and P2 being fluidly coupled to an outlet port of the check valve 628 and configured to receive pressurized fluid therefrom. The directional control valve 630 can also have a first tank port "T1" and a second tank port "T2", with both tank ports T1 and T2 being fluidly coupled to the tank 606.

The directional control valve 630 also has four workports: a first workport "A" configured to be fluidly coupled to the first chamber 518 of the hydraulic actuator 218, a second workport "B" configured to be fluidly coupled to the second chamber 520 of the hydraulic actuator 218, a third workport "C" configured to be fluidly coupled to the third chamber 530 of the hydraulic actuator 218, and a fourth workport "D" configured to be fluidly coupled to the fourth chamber 532 of the hydraulic actuator 218.

The spool of the directional control valve 630 can be configured to shift within the bore of the valve body between three positions corresponding to the three states of the directional control valve 630. Particularly, the spool can shift between a first or "centered" position, a second or "retract" position, and a third or "extend" position. The directional control valve 630 includes a first centering spring 672 and a second centering spring 674 configured to apply respective biasing forces on the spool in opposite directions so as to position the spool in the centered position. If a pilot fluid signal is provided from the first pilot valve 636 to the first pilot port 652 of the directional control valve 630, the spool shifts to the retract position. On the other hand, if a pilot fluid signal is provided from the second pilot valve 638 to the second pilot port 664 of the directional control valve 630, the spool shifts to the extend position.

Referring back to FIG. 6, the directional control valve 630 is shown with the spool being in the centered position. In the centered position, the first inlet port P1 is fluidly coupled to the workport C, which is fluidly coupled to the third chamber 530. Also, in the centered position, the workport D, which is fluidly coupled to the fourth chamber 532, is fluidly coupled to the first tank port T1. As a result, the second piston 522 is retracted as depicted in FIG. 6 and stops at the partition 502, which operates as a stopper to the second piston 522. In the retracted position of the second piston 522, the fourth chamber 532 is reduced in volume (e.g., the volume of the fourth chamber 532 is substantially reduced and amounts to a volume between the piston head 524 when the second piston 522 is fully retracted and the partition 502).

Further, in the centered position, the second inlet port P2 is fluidly coupled to the workport B, which is fluidly coupled to the second chamber 520. Also, in the centered position, the workport A, which is fluidly coupled to the first chamber 518, is fluidly coupled to the second tank port T2. As a result, the first piston 508 is extended as depicted in FIG. 6 and stops at an end of the cylinder 500, which operates as a stopper to the first piston 508. In the extended position of the first piston 508, the first chamber 518 is reduced in volume (e.g., the volume of the first chamber 518 is substantially reduced and amounts to a volume between the piston head 510 when the first piston 508 is fully extended and the end of the cylinder 500).

When the first piston 508 is fully extended, the first position sensor 534 detects the first indicator 535 and can thus indicate to the controller 620 that the first piston 508 has reached its fully extended position. Also, when the second piston 522 is fully retracted, the second position sensor 536 detects the second indicator 537 and can thus indicate to the controller 620 that the second piston 522 has reached its fully retracted position.

The hydraulic system includes four orifices 676, 677, 678, and 679 disposed in each hydraulic line connecting one of the four workports A, B, C, and D and a respective chamber of the four chambers 518, 520, 530, and 532. Particularly, the first orifice 676 is disposed between the first workport A and the first chamber 518, the second orifice 677 is disposed between the second workport B and the second chamber 520, the third orifice 678 is disposed between the third workport C and the third chamber 530, and the fourth orifice 679 is disposed between the fourth workport D and the fourth chamber 532. In examples, the hydraulic system 600 can include at least one of the four orifices 676-679.

The orifices 676-679 can operate as flow restrictors or dampers to control fluid flow rate to and from the hydraulic actuator 218 and dampen motion of the pistons 508 and 522. This way, the hydraulic system 600 can limit or preclude any jerky motion of the pistons 508, 522 and corresponding jerky motion of the rear axle 208 of the landing gear 102, thereby enabling smooth steering of the aircraft 100.

Further, the hydraulic system 600 includes a first recirculation check valve 690 and a second recirculation check valve 692. The first recirculation check valve 690 is configured to fluidly couple the tank 606 to the third chamber 530, and the second recirculation check valve 692 is configured to fluidly couple the tank 606 to the second chamber 520. Fluid in the tank 606 can be maintained at a pressure level that is slightly elevated level from atmospheric pressure. For instance, fluid in the tank 606 can be maintained at a pressure level of 70-100 psi. As such, if during motion of the pistons 508, 522 a malfunction occurs and pressurized fluid is not provided to the second chamber 520 and the third chamber 530, the recirculation check valves 690 and 692 allow fluid from the tank 606 to fill the second chamber 520 and the third chamber 530. This way, cavitation of the second chamber 520 and the third chamber 530 can be precluded (i.e., pressure level within the second chamber 520 and the third chamber 530 is not reduced below 0 psi).

In the hydraulic system 600 as depicted schematically in FIG. 6, the various hydraulic lines can be pipes or hoses connecting the various components, or can be fluid passages drilled in a manifold configured to receive various components of the hydraulic system 600. Further, the tank 606 is shown in multiple places in the hydraulic system 600 to reduce visual clutter in the drawing. Practically, the hydraulic system 600 can include one reservoir or tank and all the hydraulic lines depicted in FIG. 6 leading to the tank 606 can be fluidly coupled to such one reservoir or tank. Operation of the hydraulic system 600 in various states is described next.

The state shown in FIG. 6 corresponds to the position of the rear axle 208 shown in FIG. 2. Particularly, when the spool of the directional control valve 630 is in the centered position, the first piston 508 is fully extended, whereas the second piston 522 is fully retracted, and thus the hydraulic actuator 218 locks or centers the rear axle 208 in the position shown in FIG. 2. When the rear axle 208 is centered (i.e., un-rotated about the joint 210), the aircraft 100 can move in a straight line (e.g., without turning). Further, the controller 620 can provided an indication (e.g., a message) to the pilot indicating that it is safe to take-off, for example.

Figure 8:
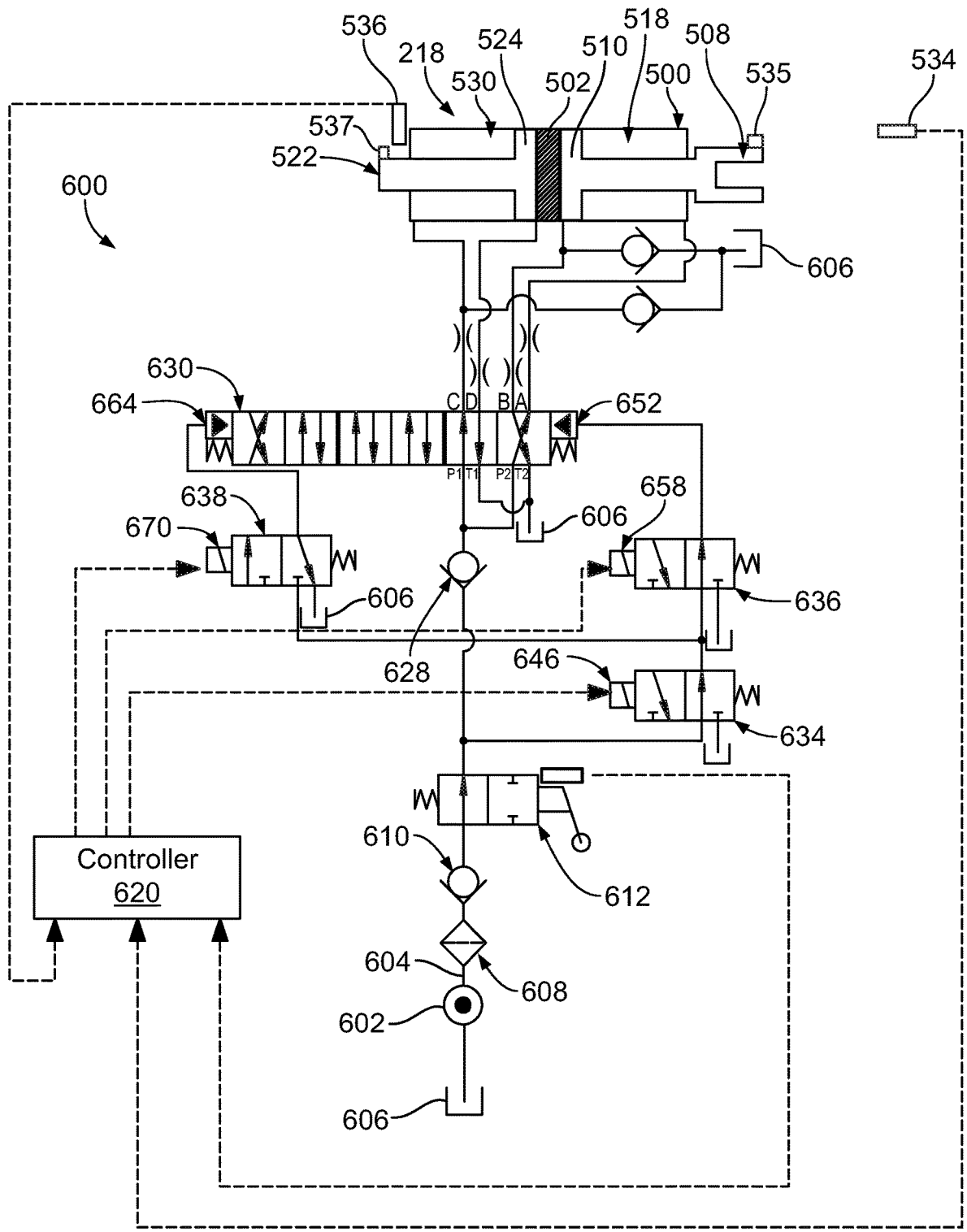
FIG. 8 illustrates a hydraulic system configured for a right turn, in accordance to an example implementation.

FIG. 8 illustrates the hydraulic system 600 configured for a right turn, in accordance with an example implementation. A pilot seeking to steer the aircraft 100 to make a right turn can send a command (e.g., via a pedal, joystick, or other steering devices in the cockpit) to the controller 620 requesting a right turn. The controller 620 in turn sends signals to the solenoid 646 and the solenoid 658 to actuate the pilot enabling valve 634 and the first pilot valve 636, respectively, thereby providing fluid to the first pilot port 652. The second pilot valve 638 is not actuated, and therefore no pressurized fluid is provided to the second pilot port 664; rather, the second pilot port 664 is vented to the tank 606. As a result, the spool of the directional control valve 630 shifts under pressure at the first pilot port 652 to the retract position depicted in FIG. 8.

In the retract position, similar to when the spool is in the centered position, the first inlet port P1 is fluidly coupled to the workport C, which is fluidly coupled to the third chamber 530. The workport D, which is fluidly coupled to the fourth chamber 532, is fluidly coupled to the first tank port T1. As a result, the second piston 522 is retracted as depicted in FIG. 8 and stops at the partition 502.

Also, in the retract position, the second inlet port P2 is fluidly coupled to the workport A, which is fluidly coupled to the first chamber 518. The workport B, which is fluidly coupled to the second chamber 520, is fluidly coupled to the second tank port T2. As noted above, the cylinder 500 is floating between the first piston 508 and the second piston 522, and is thus free to move longitudinally along the central longitudinal axis 514. As a result, the first piston 508 is retracted (or the cylinder 500 moves relative to the first piston 508) as depicted in FIG. 8, until the piston head 510 stops at partition 502, which operates as a stopper for the first piston 508. The second chamber 520 is thus reduced in volume, e.g., the volume of the second chamber 520 is substantially reduced and amounts to a volume between the piston head 510 when the first piston 508 is fully retracted.

Thus, pressurized fluid causes both the first piston 508, which is coupled to the chassis 202, and the second piston 522, which is coupled to the rear axle 208, to retract. As a result, referring back to FIG. 4, the rear axle 208 rotates counter-clockwise about the joint 210, causing the wheels 216A, 216B to rotate leftward and causing the aircraft 100 to make a right-hand turn as it moves forward. The first position sensor 534 can indicate to the controller 620 that the first piston 508 is not fully extended, but is rather retracted because it does not detect the first indicator 535. The second position sensor 536 can indicate to the controller 620 that the second piston 522 is in its fully retracted position because the second position sensor 536 detects the second indicator 537.

Figure 9:
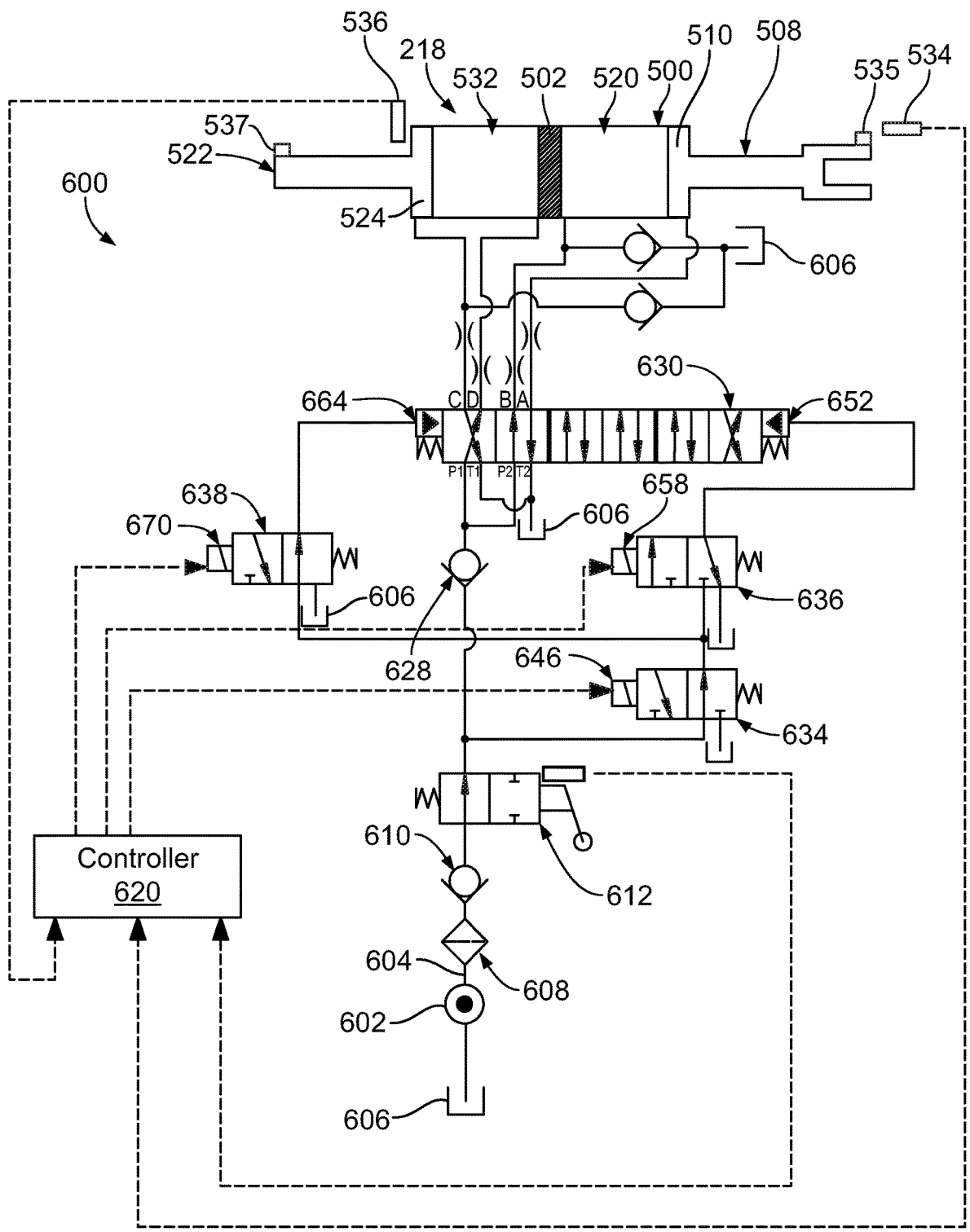
FIG. 9 illustrates a hydraulic system configured for a left turn, in accordance with an example implementation.

FIG. 9 illustrates the hydraulic system 600 configured for a left turn, in accordance with an example implementation. A pilot seeking to steer the aircraft 100 to make a left turn can send a command (e.g., via a pedal, joystick, or other steering devices in the cockpit) to the controller 620 requesting a left turn. In response, the controller 620 sends signals to the solenoid 646 and the solenoid 670 to actuate the pilot enabling valve 634 and the second pilot valve 638, respectively, thereby providing fluid to the second pilot port 664. The first pilot valve 636 is not actuated, and therefore no pressurized fluid is provided to the first pilot port 652; rather, the first pilot port 652 is vented to the tank 606. As a result, the spool of the directional control valve 630 shifts under pressure at the second pilot port 664 to the extend position depicted in FIG. 9.

In the extend position, the first inlet port P1 is fluidly coupled to the workport D, which is fluidly coupled to the fourth chamber 532. The workport C, which is fluidly coupled to the third chamber 530, is fluidly coupled to the first tank port T1. As a result, the second piston 522 is extend as depicted in FIG. 9 until the piston head 524 stops at an end of the cylinder 500.

Also, in the extend position, similar to when the spool is in the centered position, the second inlet port P2 is fluidly coupled to the workport B, which is fluidly coupled to the second chamber 520, and the workport A, which is fluidly coupled to the first chamber 518, is fluidly coupled to the second tank port T2. As a result, the first piston 508 is extended as depicted in FIG. 9, until the piston head 510 stops at the end of the cylinder 500.

The first position sensor 534 can indicate to the controller 620 that the first piston 508 has reached the end of its stroke because it detects the first indicator 535. On the other hand, the second position sensor 536 can indicate to the controller 620 that the second piston 522 is not in its fully retracted position, but is rather extended because the second position sensor 536 does not detect the second indicator 537.

The sensor information signals from the position sensors 534, 536 indicate whether the hydraulic system 600 is operating as expected. For instance, if both position sensors 534, 536 indicate that the first piston 508 and the second piston 522 are fully extended (i.e., the first position sensor 534 detects the first indicator 535 but the second position sensor 536 does not detect the second indicator 537) after providing a signal to the second pilot valve 638, then the hydraulic system 600 is operating as expected. If the position sensors 534, 536 indicate that the first piston 508 and the second piston 522 are fully extended without the controller 620 providing a signal to the second pilot valve 638, then the hydraulic system 600 might not be operating as expected and a maintenance alert might be generated.

Thus, pressurized fluid causes both the first piston 508, which is coupled to the chassis 202, and the second piston 522, which is coupled to the rear axle 208, to extend. As a result, referring back to FIG. 3, the rear axle 208 rotates clockwise about the joint 210, causing the wheels 216A, 216B to rotate rightward and causing the aircraft 100 to make a left-hand turn as it moves forward.

The configuration of the landing gear 102 and the hydraulic system 600 can protect the landing gear 102 against shimmy. Shimmy is an oscillation in a landing gear that can generate undesirable vibration and loads on a structure of the landing gear. If the rear axle 208, for example, is allowed to move back and forth through a neutral point (e.g., a zero steered angle or zero rotation point about the joint 210), shimmy can occur. The rear axle 208 can move back and forth if the system has low stiffness or includes some clearances or "free play" that provides free motion in a path of the load applied to the rear axle 208 or the hydraulic actuator 218 that controls motion of the rear axle 208.

Existing steering systems can involve clearances in a path of the load applied to an axle so as to operate correctly. Such clearances are controlled to a high tolerance to limit shimmy, rendering the system expensive to manufacture and assemble. Further, existing systems might involve using expensive servo valves and closed-loop control system that relies on linear variable differential transformer (LVDT) position sensors to operate while limiting shimmy.

The hydraulic system 600 described above can alleviate clearances in the path of loads applied to the rear axle 208, and may thus preclude shimmy. In particular, when the spool of the directional control valve 630 is in the centered position, the first piston 508 and the second piston 522 are clamped or pushed against their respective stops under high forces resulting from high pressure levels (e.g., 5000-6000 psi) applied by pressurized fluid delivered to the second chamber 520 and the third chamber 530 on the pistons 508, 522. By pushing the pistons 508, 522 against their respective stops under high forces, clearance or "free play" may be eliminated, thereby eliminating potential shimmy.

If a malfunction occurs in the hydraulic system 600 and no pressurized fluid is delivered to the hydraulic actuator 218, the check valves 610 and 628 trap pressurized fluid in the hydraulic actuator 218 and preclude reverse flow, thereby holding the pistons 508, 522 in place secured against their respective stops. Further, if a malfunction occurs during a turn and no pressurized fluid is delivered to the hydraulic actuator 218, fluid in the fourth chamber 532 is displaced as the second piston 522 returns to its retracted position and the third chamber 530 is filled by way of the recirculation check valve 690. Similarly, the first piston 508 returns to its extended position, and the second chamber 520 is filled by way of the recirculation check valve 692. Because the second piston 522 returns to its fully retracted position, the rear axle 208 returns to its un-rotated position shown in FIG. 2. Further, the rear axle 208 might not traverse or rotate through its neutral point at the joint 210, and therefore might not be subjected to an oscillatory condition.

Figure 10:
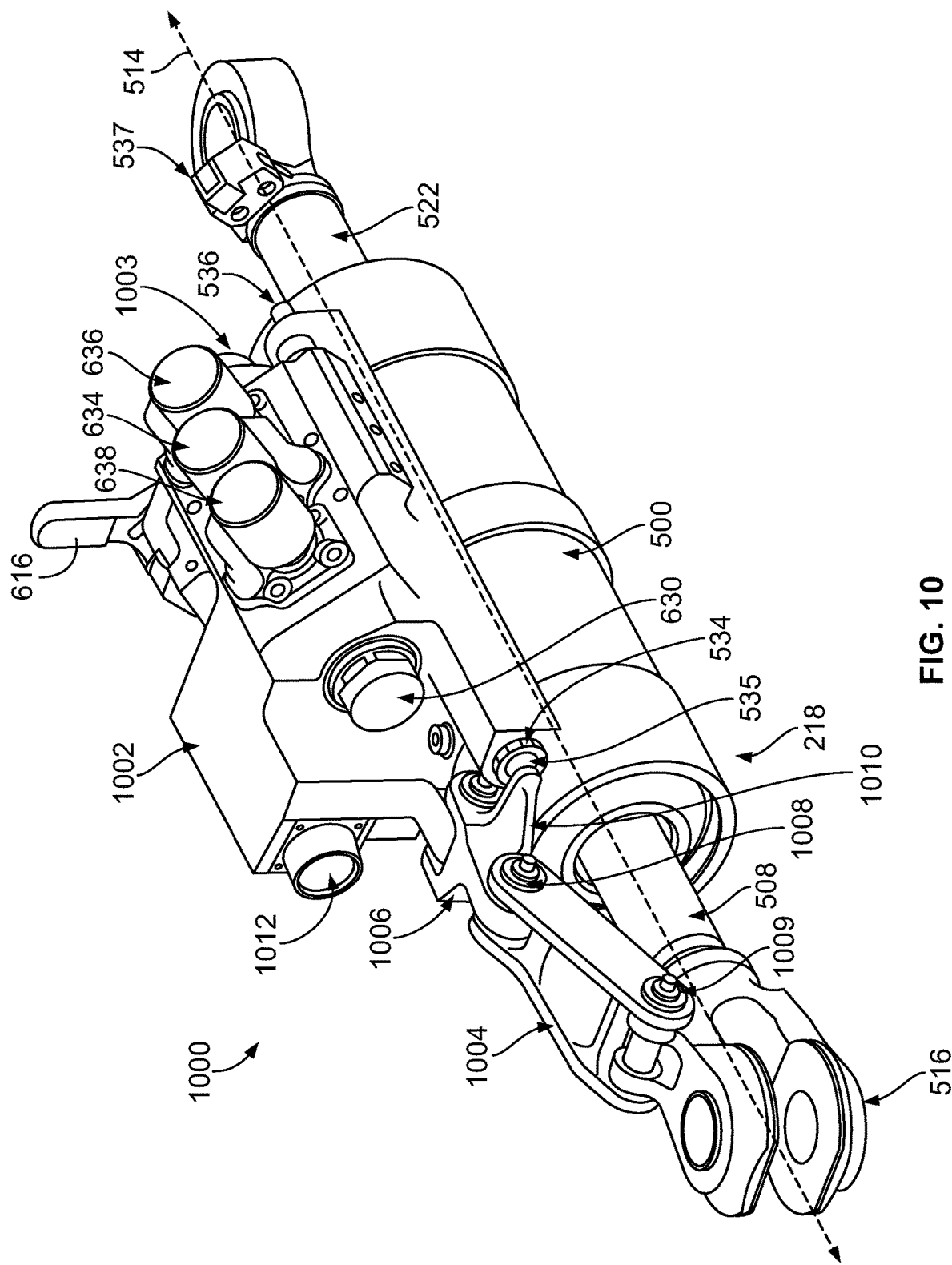
FIG. 10 illustrates an assembly of a hydraulic actuator and a valve manifold mounted thereto, in accordance with an example implementation.

FIG. 10 illustrates an assembly 1000 of the hydraulic actuator 218 and a valve manifold 1002 mounted thereto, in accordance with an example implementation. In the implementation shown in FIG. 10, components of the hydraulic system 600 (e.g., the check valve 610, the shutoff valve 612, the check valve 628, the pilot enabling valve 634, the first pilot valve 636, the second pilot valve 638, the directional control valve 630, the orifices 676-679, and the recirculation check valves 690, 692) can be integrated in the valve manifold 1002, which can be mounted to the cylinder 500 of the hydraulic actuator 218. A pump inlet port coupled to the supply line 604 and a tank port coupled to the tank 606 can be located at an end 1003 of the valve manifold 1002.

In an example, the valve manifold 1002 can be coupled to the cylinder 500 via tie rods or other fastening mechanism, and in another example, the cylinder 500 and the valve manifold 1002 can be made as a single integrated housing configured to receive components of the hydraulic system 600. Mounting the valve manifold 1002 on or close to the hydraulic actuator 218, as opposed to being remote therefrom, alleviates the use of hydraulic lines between the valve manifold 1002 and the hydraulic actuator 218. As a result, line capacitances associated with hydraulic lines are alleviated, thereby improving stiffness of the hydraulic system and improving motion control of the pistons 508, 522.

As depicted in FIG. 10, the assembly 1000 includes a first torsion link 1004 and a second torsion link 1006 rotatably coupled to each other at a hinge or pivot 1008. The pivot 1008 allows the first torsion link 1004 to rotate relative to the second torsion link 1006. The first torsion link 1004 is coupled to a distal end of the first piston 508, e.g., coupled to the clevis 516, at a pivot 1009 and the clevis 516 is configured to be coupled to the chassis 202 at the pivot 222 as described above.

As such, as the first piston 508 moves (e.g., retracts), the first torsion link 1004 can rotate about the pivot 1009 and also rotate about the pivot 1008 relative to the second torsion link 1006. Further, with this configuration, the first torsion link 1004 and the second torsion link 1006 preclude the cylinder 500 of the hydraulic actuator 218 and the valve manifold 1002 from rotating about the central longitudinal axis 514 during motion of the first piston 508 and the second piston 522.

The second torsion link 1006 can have an extension 1010 that is coupled to the first indicator 535. Positions (e.g., rotary positions) of the first torsion link 1004 and the second torsion link 1006 are geometrically related to the linear position of the first piston 508. Thus, when the first piston 508 reaches an end of its stroke (e.g., when the first piston 508 is fully extended), the corresponding position of the second torsion link 1006 and its extension 1010 cause the first indicator 535 to approach the first position sensor 534 and the first position sensor 534 thus detects the first indicator 535. The first position sensor 534 then sends a signal to the controller 620 to indicate that the first piston 508 has reached the end of its stroke (i.e., is fully extended).

On the other hand, the second position sensor 536 can be mounted to the valve manifold 1002 at the end 1003 as shown. The second indicator 537 can be coupled to the second piston 522. When the second piston 522 is fully retracted, the second position sensor 536 detects the second indicator 537 and sends a signal to the controller 620 to indicate that the second piston 522 is fully retracted.

The valve manifold 1002 can further include an electrical connector 1012. Electric wires, or an electric plug connected to such electric wires, can be inserted into the electrical connector 1012 so as to provide electric power to respective solenoids of the valves 634, 636, and 638 as well as provide commands from the controller 620 to the respective solenoids. Sensor signal wires from the position sensors 534, 536 can also be connected to the electrical connector 1012, and electric wires can then connect the electrical connector 1012 to the controller 620 to electrically couple the position sensors 534, 536 to the controller 620 and provide sensor signals thereto.

FIG. 11 is a flowchart of a method 1100 of steering an aircraft, in accordance with an example implementation. The method 1100 presents an example of a method that can be implemented by the controller 620, for example. Further, FIGS. 12-13 are flowcharts of methods for use with the method 1100.

The method 1100 may include one or more operations, or actions as illustrated by one or more of blocks 1102-1108. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1100 and other processes and operations disclosed herein, the flowchart shows operation of one possible implementation of present examples. In this regard, each block may represent a module, a segment, or a portion of program code, which includes one or more instructions executable by a processor or a controller (e.g., the controller 620) for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 1100 and other processes and operations disclosed herein, one or more blocks in FIGS. 11-14 may represent circuitry or digital logic that is arranged to perform the specific logical operations in the process.

At block 1102, the method 1100 includes receiving, at the controller 620, a request to steer the aircraft 100 in a particular direction. The request can come from a joystick, pedal, or similar input or steering control device controlled by a pilot, for example. As mentioned above, the aircraft 100 can include the landing gear 102 having a chassis 202, at least one axle (e.g., the rear axle 208) rotatably coupled to the chassis 202 at the joint 210, and respective wheels 216A, 216B mounted to respective ends of the rear axle 208 at least one axle, such that rotation of the rear axle 208 about the joint 210 causes the aircraft 100 to be steered. The aircraft 100 also includes the hydraulic actuator 218 comprising the cylinder 500, the first piston 208 slidably accommodated in the cylinder 500 and coupled to the chassis 202, and the second piston 522 slidably accommodated in the cylinder 500 and coupled to the rear axle 208. The aircraft 100 further includes the directional control valve 630 configured to control fluid flow from the source 602 of pressurized fluid to the hydraulic actuator 218 and fluid flow from the hydraulic actuator 218 to the tank 606 so as to control motion of the first piston 508 and the second piston 522 within the cylinder 500.

At block 1104, the method 1100 includes in response to receiving the request, sending, by the controller 620, a signal to actuate either the first pilot valve 636 or the second pilot valve 638 to provide pressurized fluid to the first pilot port 652 of the directional control valve 630 or to the second pilot port 664 of the directional control valve 630 so as to actuate the directional control valve 630 and provide pressurized fluid to the hydraulic actuator 218, thereby moving at least one of the first piston 508 and the second piston 522 to rotate the rear axle 208 about the joint 210 and steer the aircraft 100 in the particular direction.

FIG. 12 is a flowchart of additional operations that can be executed and performed with the method 1100, in accordance with an example implementation. In addition to a first signal sent to the either the first pilot valve 636 or the second pilot valve 638, at block 1106, operations include sending a second signal to the pilot enabling valve 634 to enable providing pressurized fluid from the source 602 of pressurized fluid to the first pilot valve 636 and the second pilot valve 638 and enable actuation of the directional control valve 630.

FIG. 13 is a flowchart of additional operations that can be executed and performed with the method 1100, in accordance with an example implementation. The aircraft 100 can further include the shutoff valve 612 fluidly coupled to the directional control valve 630 and configured to be fluidly coupled to the source 602 of pressurized fluid. The shutoff valve 612 is normally-open and configured to provide pressurized fluid to the directional control valve 630 when unactuated to enable steering of the aircraft 100. When the shutoff valve 612 is actuated, the shutoff valve 612 is configured to block pressurized fluid from flowing to the directional control valve 630 to disable steering of the aircraft 100. The shutoff valve 612 can include the position sensor 618 configured to provide sensor information indicating whether the shutoff valve 612 is actuated. At block 1108, operations include receiving, from the position sensor 618 of the shutoff valve 612, sensor information indicating that the shutoff valve 612 is unactuated, where sending the signal to actuate either the first pilot valve 636 or the second pilot valve 638 is responsive to receiving the sensor information indicating that the shutoff valve 612 is unactuated.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A hydraulic system comprising:
a hydraulic actuator comprising: (i) a cylinder, (ii) a partition disposed in the cylinder and configured to divide the cylinder into a first partition and a second partition, (iii) a first piston slidably accommodated in the first partition and having a piston head and a rod extending from the piston head along a longitudinal axis of the cylinder, wherein the piston head divides the first partition into a first chamber and a second chamber, and (iv) a second piston slidably accommodated in the second partition and having a respective piston head and a respective rod extending from the respective piston head along the longitudinal axis of the cylinder, wherein the respective piston head divides the second partition into a third chamber and a fourth chamber; and
a directional control valve comprising: (i) a first inlet port configured to be fluidly coupled to a source of pressurized fluid, (ii) a second inlet port configured to be fluidly coupled to the source of pressurized fluid, (iii) a first tank port configured to be fluidly coupled to a tank, (iv) a second tank port configured to be fluidly coupled to the tank, (v) a first workport configured to be fluidly coupled to the first chamber, (vi) a second workport configured to be fluidly coupled to the second chamber, (vii) a third workport configured to be fluidly coupled to the third chamber, and (viii) a fourth workport configured to be fluidly coupled to the fourth chamber;
wherein the rod is coupled to a first link configured to be coupled to a chassis of a landing gear of an aircraft at a pivot, wherein a second link is coupled to the first link and is configured to couple to an axle of the landing gear of the aircraft, and wherein the respective rod is configured to be coupled to the axle.

2. The hydraulic system of claim 1, wherein the directional control valve further comprises a first pilot port and a second pilot port, and wherein the hydraulic system further comprises:
a first pilot valve fluidly coupled to the first pilot port and configured to receive pressurized fluid from the source of pressurized fluid and, when actuated, provide pressurized fluid to the first pilot port to actuate the directional control valve to operate in a first state; and
a second pilot valve fluidly coupled to the second pilot port and configured to receive pressurized fluid from the source of pressurized fluid and, when actuated, provide pressurized fluid to the second pilot port to actuate the directional control valve to operate in a second state.

3. The hydraulic system of claim 2, further comprising:
a pilot enabling valve configured to be fluidly coupled to the source of pressurized fluid and configured to:
when actuated, provide pressurized fluid from the source of pressurized fluid to the first pilot valve and the second pilot valve, and
when unactuated, block pressurized fluid to the first pilot valve and the second pilot valve.

4. The hydraulic system of claim 1, further comprising:
a shutoff valve fluidly coupled to the first inlet port and the second inlet port of the directional control valve and configured to be fluidly coupled to the source of pressurized fluid, wherein:
the shutoff valve is normally-open and configured to provide pressurized fluid to the first inlet port and the second inlet port when unactuated, and
when the shutoff valve is actuated, the shutoff valve is configured to block pressurized fluid from flowing to the first inlet port and the second inlet port.

5. The hydraulic system of claim 4, wherein the shutoff valve is manually-actuated via a lever coupled thereto.

6. The hydraulic system of claim 5, wherein the shutoff valve further comprises:
a position sensor configured to provide sensor information indicating whether the lever and the shutoff valve are actuated.

7. The hydraulic system of claim 1, further comprising:
a first recirculation check valve configured to fluidly couple the tank to the third chamber of the hydraulic actuator; and a second recirculation check valve configured to fluidly couple the tank to the second chamber of the hydraulic actuator.

8. The hydraulic system of claim 1, further comprising at least one of: (i) a first orifice disposed between the first workport and the first chamber, (ii) a second orifice disposed between the second workport and the second chamber, (iii) a third orifice disposed between the third workport and the third chamber, and (iv) a fourth orifice disposed between the fourth workport and the fourth chamber.

9. The hydraulic system of claim 1, further comprising:
at least one check valve disposed between the source of pressurized fluid and the directional control valve, wherein the at least one check valve is configured to allow fluid flow from the source of pressurized fluid to the directional control valve, while blocking reverse fluid flow from the hydraulic actuator through the directional control valve to the source of pressurized fluid.

10. The hydraulic system of claim 1, further comprising:
a first position sensor coupled to the hydraulic actuator and configured to provide sensor information indicating whether the first piston is fully extended; and
a second position sensor coupled to the hydraulic actuator and configured to provide sensor information indicating whether the second piston is fully retracted.

11. An aircraft comprising:
a landing gear having (i) a chassis, (ii) at least one axle rotatably coupled to the chassis at a joint, and (iii) respective wheels mounted to respective ends of the at least one axle, such that rotation of the at least one axle about the joint causes the aircraft to be steered;
a hydraulic actuator comprising: (i) a cylinder, (ii) a partition disposed in the cylinder and configured to divide the cylinder into a first partition and a second partition, (iii) a first piston slidably accommodated in the first partition and having a piston head and a rod extending from the piston head along a longitudinal axis of the cylinder, wherein the rod is coupled to the chassis, and wherein the piston head divides the first partition into a first chamber and a second chamber, and (iv) a second piston slidably accommodated in the second partition and having a respective piston head and a respective rod extending from the respective piston head along the longitudinal axis of the cylinder, wherein the respective rod is coupled to the at least one axle, and wherein the respective piston head divides the second partition into a third chamber and a fourth chamber; and
a directional control valve comprising: (i) a first inlet port configured to be fluidly coupled to a source of pressurized fluid, (ii) a second inlet port configured to be fluidly coupled to the source of pressurized fluid, (iii) a first tank port configured to be fluidly coupled to a tank, (iv) a second tank port configured to be fluidly coupled to the tank, (v) a first workport configured to be fluidly coupled to the first chamber, (vi) a second workport configured to be fluidly coupled to the second chamber, (vii) a third workport configured to be fluidly coupled to the third chamber, and (viii) a fourth workport configured to be fluidly coupled to the fourth chamber.

12. The aircraft of claim 11, wherein the directional control valve further comprises a first pilot port and a second pilot port, and wherein the aircraft further comprises:
a first pilot valve fluidly coupled to the first pilot port and configured to receive pressurized fluid from the source of pressurized fluid and, when actuated, provide pressurized fluid to the first pilot port to actuate the directional control valve and move at least one of the first piston and the second piston to rotate the at least one axle in a first rotational direction and steer the aircraft in a corresponding direction; and
a second pilot valve fluidly coupled to the second pilot port and configured to receive pressurized fluid from the source of pressurized fluid and, when actuated, provide pressurized fluid to the second pilot port to actuate the directional control valve and move at least one of the first piston and the second piston to rotate the at least one axle in a second rotational direction and steer the aircraft in a respective corresponding direction.

13. The aircraft of claim 12, further comprising:
a pilot enabling valve configured to be fluidly coupled to the source of pressurized fluid and configured to:
when actuated, provide pressurized fluid from the source of pressurized fluid to the first pilot valve and the second pilot valve, and
when unactuated, block pressurized fluid to the first pilot valve and the second pilot valve to disable steering of the aircraft.

14. The aircraft of claim 11, further comprising:
a shutoff valve fluidly coupled to the first inlet port and the second inlet port of the directional control valve and configured to be fluidly coupled to the source of pressurized fluid, wherein:
the shutoff valve is normally-open and configured to provide pressurized fluid to the first inlet port and the second inlet port when unactuated to enable steering of the aircraft, and
when the shutoff valve is actuated, the shutoff valve is configured to block pressurized fluid from flowing to the first inlet port and the second inlet port to disable steering of the aircraft.

15. The aircraft of claim 11, further comprising:
a first recirculation check valve configured to fluidly couple the tank to the third chamber of the hydraulic actuator; and
a second recirculation check valve configured to fluidly couple the tank to the second chamber of the hydraulic actuator.

16. The aircraft of claim 11, further comprising at least one of: (i) a first orifice disposed between the first workport and the first chamber, (ii) a second orifice disposed between the second workport and the second chamber, (iii) a third orifice disposed between the third workport and the third chamber, and (iv) a fourth orifice disposed between the fourth workport and the fourth chamber, such that the first orifice, the second orifice, the third orifice, and the fourth orifice are configured to restrict fluid flow rate therethrough to dampen motion of the first piston and the second piston.

17. The aircraft of claim 11, further comprising:
at least one check valve disposed between the source of pressurized fluid and the directional control valve, wherein the at least one check valve is configured to allow fluid flow from the source of pressurized fluid to the directional control valve, while blocking reverse fluid flow from the hydraulic actuator through the directional control valve to the source of pressurized fluid.

18. A method of steering an aircraft, the method comprising:
receiving, at a controller, a request to steer the aircraft in a particular direction, wherein the aircraft comprises:

(i) a landing gear having a chassis, at least one axle rotatably coupled to the chassis at a joint, and respective wheels mounted to respective ends of the at least one axle, such that rotation of the at least one axle about the joint causes the aircraft to be steered, (ii) a hydraulic actuator comprising a cylinder, a first piston slidably accommodated in the cylinder and coupled to the chassis, and a second piston slidably accommodated in the cylinder and coupled to the at least one axle, and (iii) a directional control valve configured to control fluid flow from a source of pressurized fluid to the hydraulic actuator and fluid flow from the hydraulic actuator to a tank so as to control motion of the first piston and the second piston within the cylinder; and in response to receiving the request, sending, by the controller, a signal to actuate either a first pilot valve or a second pilot valve to provide pressurized fluid to a first pilot port of the directional control valve or to a second pilot port of the directional control valve so as to actuate the directional control valve and provide pressurized fluid to the hydraulic actuator, thereby moving at least one of the first piston and the second piston to rotate the at least one axle about the joint and steer the aircraft in the particular direction.

19. The method of claim 18, wherein the signal is a first signal, and wherein the method further comprises:

sending a second signal to a pilot enabling valve to enable providing pressurized fluid from the source of pressurized fluid to the first pilot valve and the second pilot valve and enable actuation of the directional control valve.

20. The method of claim 18, wherein the aircraft further comprises a shutoff valve fluidly coupled to the directional control valve and configured to be fluidly coupled to the source of pressurized fluid, wherein the shutoff valve is normally-open and configured to provide pressurized fluid to the directional control valve when unactuated to enable steering of the aircraft, and when the shutoff valve is actuated, the shutoff valve is configured to block pressurized fluid from flowing to the directional control valve to disable steering of the aircraft, wherein the shutoff valve comprises a position sensor configured to provide sensor information indicating whether the shutoff valve is actuated, and wherein the method further comprises:

receiving, from the position sensor of the shutoff valve, sensor information indicating that the shutoff valve is unactuated, wherein sending the signal to actuate either the first pilot valve or the second pilot valve is responsive to receiving the sensor information indicating that the shutoff valve is unactuated.

* * * * *